Patented Jan. 31, 1939

2,145,392

UNITED STATES PATENT OFFICE 2,145,392

PREPARATION OF BIURET

Jesse Harmon, Wilmington, Del., assignor to E. I. du Pont de Nemours & Company, Wilmington, Del., a corporation of Delaware No Drawing. Application May 12, 1938, Serial No. 207,545

4 Claims. (Cl. 260—553)

This invention relates to the preparation of biuret and, more particularly, to a process of preparing biuret from urea wherein the yield of biuret is substantially improved.

Heretofore, biuret has been prepared by heating urea at various temperatures at atmospheric pressure. Although biuret is formed in this manner the yield is quite low due to the fact that as the temperature is increased, or the heating prolonged, to convert more of the urea, formation of by-products is increased and the yield of biuret remains relatively low. Since the formation of biuret by pyrolysis of urea is always accompanied by the simultaneous formation of ammonia, the reaction may be represented as:

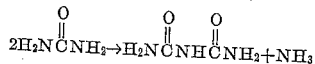

It would appear that by extending the heating of the urea the above reaction could be caused to go to completion. However, prolonged or excessive heating of the reaction mixture results in the formation of cyanuric acid and/or ammelide at the expense of the biuret.

An object of the present invention is to provide an improved process for the preparation of biuret from urea. A still further object is to provide a process wherein maximum yields of biuret and minimum yields of by-products are obtained. Other objects will be apparent from the description of the invention given hereinafter.

The above objects are accomplished according to the present invention by heating urea at a temperature of 130°–205° C. (the lower limit is approximately the melting point of urea and the upper limit is approximately the decomposition temperature of biuret) at a pressure of not substantially greater than 200 mm. of mercury to form a mixture of biuret and urea, and separating the biuret from the mixture.

It has been discovered that by the application of a vacuum to the urea pyrolysis system, the rate of reaction whereby urea is converted into biuret and ammonia is tremendously increased without a corresponding increase in the rate of the reaction wherein biuret is converted into cyanuric acid or ammelide. This is quite unexpected as it is exactly contra to the result obtained by prolonged or excessive heating of urea at atmospheric pressure in an attempt to improve the yield of biuret.

The following examples wherein parts are given by weight unless otherwise indicated, illustrate specific embodiments of the invention.

Example I

A vessel containing 200 parts of urea was heated in an oil bath at 145° C. (bath temperature) until the urea was in a semi-molten state. The vessel was then connected to a vacuum system through an air reflux condenser of wide bore and a water-cooled vessel which served as a sublimate trap. The system was evacuated to 35–40 mm. of mercury and the molten urea was held at 145°–153° C. (inside temperature) for 6.5 hours. The reaction mixture effervesced vigorously during this time and a small amount of sublimate (ammonium cyanate) collected in the trap. The molten reaction mixture was poured into 750 parts of hot water and the resulting solution was filtered. The filtrate was cooled at 0°–5° C. for a day, the biuret being precipitated in white crystalline form. The precipitate was filtered, washed with ice-cold water, and dried under reduced pressure over calcium chloride at room temperature for five days. The product amounted to 76.5 parts and melted, on a Maquenne bloc, at 180°–181° C.

After the biuret was recrystallized from 750 parts of water and dried as described above, 67 parts of white crystalline material melting at 194°–195° C. (Maquenne bloc), was obtained. A sample of this product, which was biuret containing water of crystallization, was dried over phosphorus pentoxide at 100° C. and 10 mm. of mercury pressure for six hours. The loss in weight due to the removal of water of crystallization amounted to 8.5% of the original weight. The yield of biuret, on an anhydrous basis, was 36.2% of the theoretical. Analysis of dehydrated material; calculated for $C_2H_5O_2N_3$: N, 40.74%. Found: N, 40.34%.

The above procedure was repeated exactly except that no vacuum was applied to the system. A yield of only 8.2% of the theoretical was obtained.

Example II

Example I was repeated but with the temperature of the reaction mixture maintained at 160°–169° C. for 0.5 hour and then at 169°–174° C. for 38 minutes (bath temperature 170°–185° C.) At the end of this time crystals started to form in the liquid reaction mixture. The product, after being crystallized once from water, amounted to 87.5 parts, melted at 193° C. (Maquenne bloc), and contained 5.1% of water of crystallization. The yield, on an anhydrous basis, was 49.5% of the theoretical. Analysis of dehydrated material; calculated for $C_2H_5O_2N_3$: N, 40.74%. Found: N, 40.19%.

The procedure of this example was repeated except that no vacuum was applied to the system. A yield of 8.7% of the theoretical was obtained.

Example III

In an apparatus similar to that described in Example I, 750 parts of urea were heated in a system which was evacuated to 12–25 mm. of mercury pressure. The reaction mixture was maintained at 145°–152° C. for about 9 hours at the end of which time some solid started to form. The reaction mixture was then poured into hot water and the resulting solution filtered. After being recrystallized, the product was dried under reduced pressure over calcium chloride and was found to have a melting point of 191° C. (Maquenne bloc) and to contain 5.79% of water of crystallization. The yield was 363 parts or, on an anhydrous basis, 53% of the theoretical. Analysis of dehydrated material; calculated for $C_2H_5O_2N_3$: N, 40.74%. Found: N, 39.35%.

It will be understood that the above examples are merely illustrative and that considerable variation in the temperature, duration of heating, and the vacuum applied to the system, come within the scope of the invention.

The temperature must be at least as great as the melting point of urea, i. e., about 130° C., and, of course, should not exceed the decomposition point of the biuret being formed, i. e., about 205° C. Any temperature within such limits may be used, the preferred temperature being 145°–185° C. To benefit substantially by the present invention the urea being heated must be subjected to a considerable vacuum. A pressure of 200 mm. of mercury should not be appreciably exceeded and a much lower pressure is preferred. Pressures below 50 mm. of mercury are desirable as strongly favoring the production of biuret.

Those skilled in the art will appreciate that the optimum time of heating depends on the temperature and vacuum employed. Too short a heating period will give a low yield of biuret due to incomplete reaction while prolonged heating will eventually convert the biuret formed to cyanuric acid and/or ammelide, thus decreasing the yield of biuret. For any specific temperature and pressure, a certain amount of preliminary testing will be necessary to determine the most favorable period of heating. In general, the optimum duration of heat will vary inversely with the temperature and directly with the pressure. To illustrate, at a temperature of 170° C. and 50 mm. of mercury pressure or less, the maximum yield of biuret is obtained in 1 to 2 hours whereas, if the temperature is held at 150° C. and the pressure remains the same, 9 or 10 hours heating is required for the best yield.

The invention may be carried out continuously as well as in a batch process and, when carried out continuously, a somewhat shorter period of heating gives maximum yields.

An advantage of the present invention is that it provides a relatively simple and practical process of preparing biuret from urea in appreciably greater yields than has heretofore been possible. This is due to the fact that working according to the present invention, (1) urea can be converted to biuret at a temperature lower than the temperatures favoring the consumption of biuret in the formation of secondary reaction products; (2) at temperatures which are high enough to favor the formation of secondary reaction products, i. e., 170° C. and up, the rate of the formation of biuret from urea is much faster than the rate of formation of secondary reaction products, thus increased yields of biuret are obtained whether a temperature towards the upper or lower limit of the range disclosed, is employed.

As many apparently widely different embodiments of this invention may be made without departing from the spirit and scope thereof, it is to be understood that the invention is not limited to the specific embodiments thereof except as defined in the appended claims.

I claim:

1. Process of preparing biuret comprising heating urea at a temperature of 130°–205° C. and a pressure of not greater than 200 mm. of mercury to form a mixture containing urea and biuret and separating the biuret from said mixture.

2. Process of preparing biuret comprising heating urea at a temperature of 145°–185° C. and a pressure of not greater than 200 mm. of mercury to form a mixture containing urea and biuret and separating the biuret from said mixture.

3. Process of preparing biuret comprising heating urea at a temperature of 145°–185° C. and a pressure of not greater than 50 mm. of mercury to form a mixture containing urea and biuret, and separating the biuret from said mixture.

4. Process of preparing biuret comprising heating urea at a temperature of about 170° C. and a pressure of not greater than 50 mm. of mercury for 1 to 2 hours to form a mixture containing urea and biuret, and separating the biuret from said mixture.

JESSE HARMON.

CERTIFICATE OF CORRECTION.

Patent No. 2,145,392.                                    January 31, 1939.

JESSE HARMON.

It is hereby certified that error appears in the printed specification of the above numbered patent requiring correction as follows: Page 2, first column, line 11, for "39.35%" read 39.95%; and that the said Letters Patent should be read with this correction therein that the same may conform to the record of the case in the Patent Office.

Signed and sealed this 14th day of March, A.D. 1939.

Henry Van Arsdale.

(Seal)                                        Acting Commissioner of Patents.